United States Patent
Faivre et al.

(10) Patent No.: US 7,167,797 B2
(45) Date of Patent: Jan. 23, 2007

(54) METHOD OF PREDICTING SUITABILITY FOR A CROP HARVESTING OPERATION

(75) Inventors: Steven Michael Faivre, Kingston, IL (US); Mark William Stelford, DeKalb, IL (US); Terence Daniel Pickett, Waukee, IA (US)

(73) Assignee: Deere & Company, Moline, IL (US)

( * ) Notice: Subject to any disclaimer, the term of this patent is extended or adjusted under 35 U.S.C. 154(b) by 89 days.

(21) Appl. No.: 11/074,163

(22) Filed: Mar. 7, 2005

(65) Prior Publication Data
US 2006/0196158 A1   Sep. 7, 2006

(51) Int. Cl.
*G01C 21/00* (2006.01)
(52) U.S. Cl. .............................. 701/214; 56/1
(58) Field of Classification Search ............. 56/1; 700/283, 240, 9, 244, 241, 284; 111/200; 701/50, 5, 214, 215; 702/5, 2, 3
See application file for complete search history.

(56) References Cited

U.S. PATENT DOCUMENTS

| | | | |
|---|---|---|---|
| RE31,023 E | 9/1982 | Hall, III | 47/1 R |
| 4,992,942 A | 2/1991 | Bauerle et al. | 364/420 |
| 5,467,271 A | 11/1995 | Abel et al. | 364/420 |
| 5,566,069 A | 10/1996 | Clark, Jr. et al. | 364/420 |
| 5,884,225 A | 3/1999 | Allen et al. | |
| 5,897,619 A | 4/1999 | Hargrove, Jr. et al. | 705/4 |
| 6,141,614 A | 10/2000 | Janzen et al. | 701/50 |
| 6,236,907 B1 | 5/2001 | Hauwiller et al. | 700/283 |
| 6,236,924 B1 | 5/2001 | Motz et al. | 701/50 |
| 6,529,615 B1 | 3/2003 | Hendrickson et al. | 382/110 |
| 6,549,851 B1 | 4/2003 | Greensides | 702/2 |
| 6,606,542 B1 | 8/2003 | Hauwiller et al. | 700/283 |

OTHER PUBLICATIONS

Utilization of GIS/GPS-Based Information Technology in Commercial Crop Decision Making in California, Washington, Oregon, Idaho and Arizona, Journal of Nematology, The Society of Nematologists, 2002, 7 Pages.

*Primary Examiner*—Árpád Fábián Kovács

(57) ABSTRACT

Presented herein is a method for predicting suitable times for performing a crop harvesting operation within a field. The method includes the steps of accessing predicted values for weather, crop, and soil conditions, and then predicting values for one or more additional operation variables indicating operation suitability. The method then predicts suitability for performance of the crop harvesting operation based on the predicted operation variables and selected suitability parameters.

4 Claims, 7 Drawing Sheets

| Operation: Corn Harvesting | | | Suitability Parameters | | | |
|---|---|---|---|---|---|---|
| Suitabilty Parameters | Value | Stblty | Wt | 0.0 | 1.0 | 1.0 | 0.0 |
| Weather Conditions | | | | | | | |
| Humidity | 50 % | 100% | 1 | 0 | 0 | 70 | 90 |
| Wind | 10 kph | 100% | 1 | 0 | 0 | 30 | 50 |
| Precipitation | 1 mm | 50% | 1 | 0 | 0 | 0 | 2 |
| Crop Conditions | | | | | | | |
| Maturity | 100 % | 100% | 10 | 0 | 95 | 100 | 100 |
| Moisture | 26 % | 50% | 10 | 15 | 17 | 24 | 28 |
| Operation Characteristics | | | | | | | |
| Δ Compaction | 0 % | 100% | 5 | -100 | -100 | 0 | 20 |
| Economic Impact | 0 % | 100% | 1 | -100 | -100 | 0 | 5 |
| Tractive Efficiency | 55 % | 100% | 1 | 0 | 50 | 100 | 100 |
| Overall Node Suitabilty: | | 82% | | | | | |

METHOD OF PREDICTING SUITABILITY FOR A CROP HARVESTING OPERATION

FIELD OF THE INVENTION

The present invention relates to the prediction of crop conditions and assessment of suitability for performance of a crop harvesting operation.

BACKGROUND OF THE INVENTION

Land engaged in agriculture is subjected to a number of crop harvesting operations. In order to optimize performance of these operations for efficiency, minimal crop loss, and/or minimal impact on the soil, it is critical that harvest operations be performed when crop, weather, and soil conditions are suitable. In order to aid in planning, a method of predicting suitable times for performing a number of different crop harvesting operations is desirable.

SUMMARY OF THE INVENTION

Presented herein is a method for predicting suitable times for performing a crop harvesting operation. The method includes the steps of accessing predicted values for weather, crop, and soil conditions, and then predicting one or more values for soil characteristics, operation characteristics, and operation effects. Based on these predicted operation variables and selected suitability parameters, the method predicts harvest operation suitability for different points in time.

BRIEF DESCRIPTION OF THE DRAWINGS

FIG. 4 illustrates a table displaying suitability values for performance of a crop harvesting operation at a single field node on a single day.

DETAILED DESCRIPTION

Figure 1:
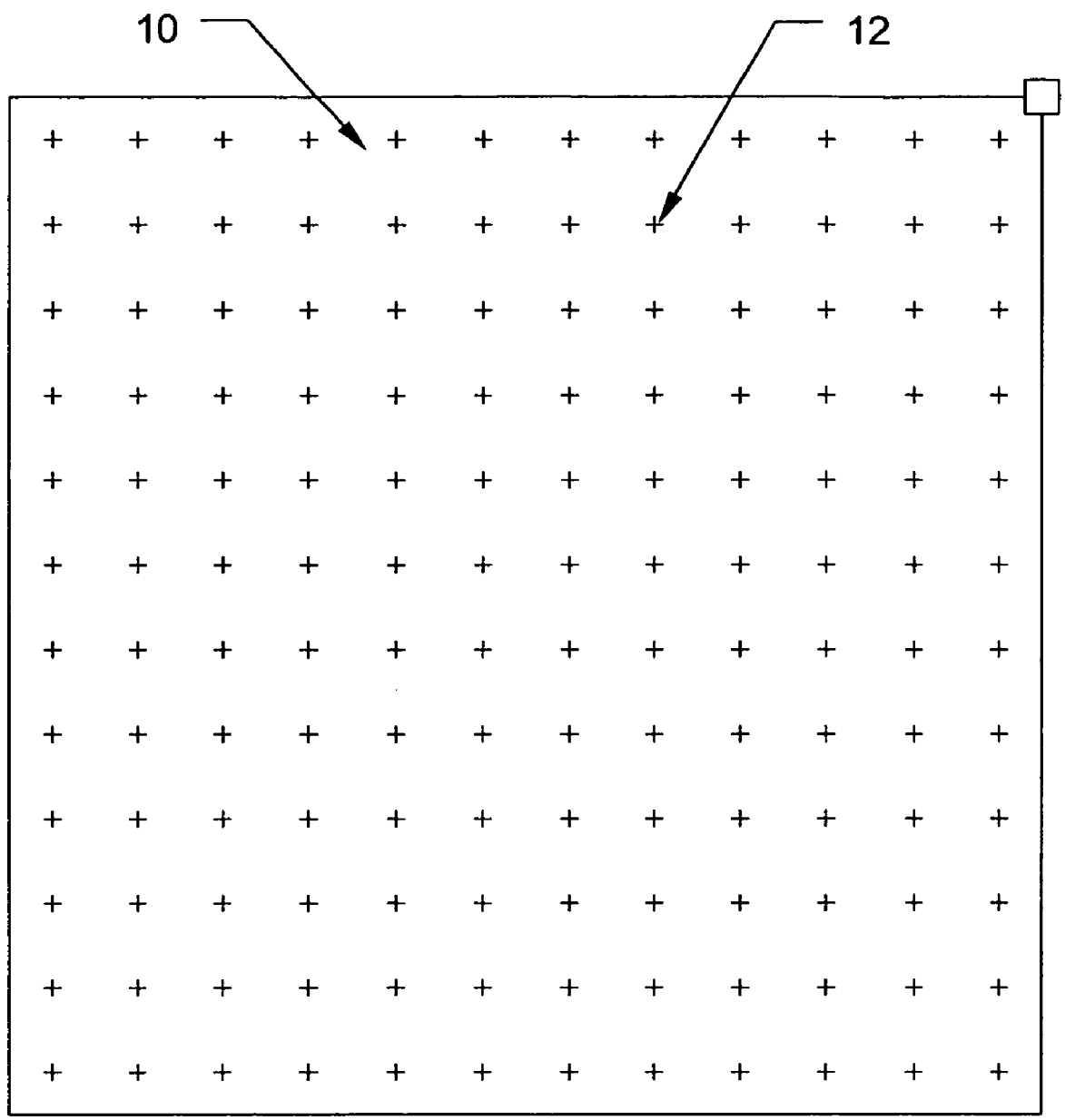
FIG. 1 illustrates a farm field having many field nodes.

FIG. 1 illustrates a parcel of land, or field 10, suitable for agricultural use, and under agricultural cultivation. As such, the field 10 may be subjected to crop harvesting operations such as mechanized mowing and combining, as well as human handpicking and animal foraging. Numerous field nodes 12 dispersed throughout field 10 divide the parcel into smaller sample areas. A method presented herein predicts suitability 6 for performing such operations in the field 10 at different points in time, based on operation variables 8 predicted for each field node 12.

Figure 2:
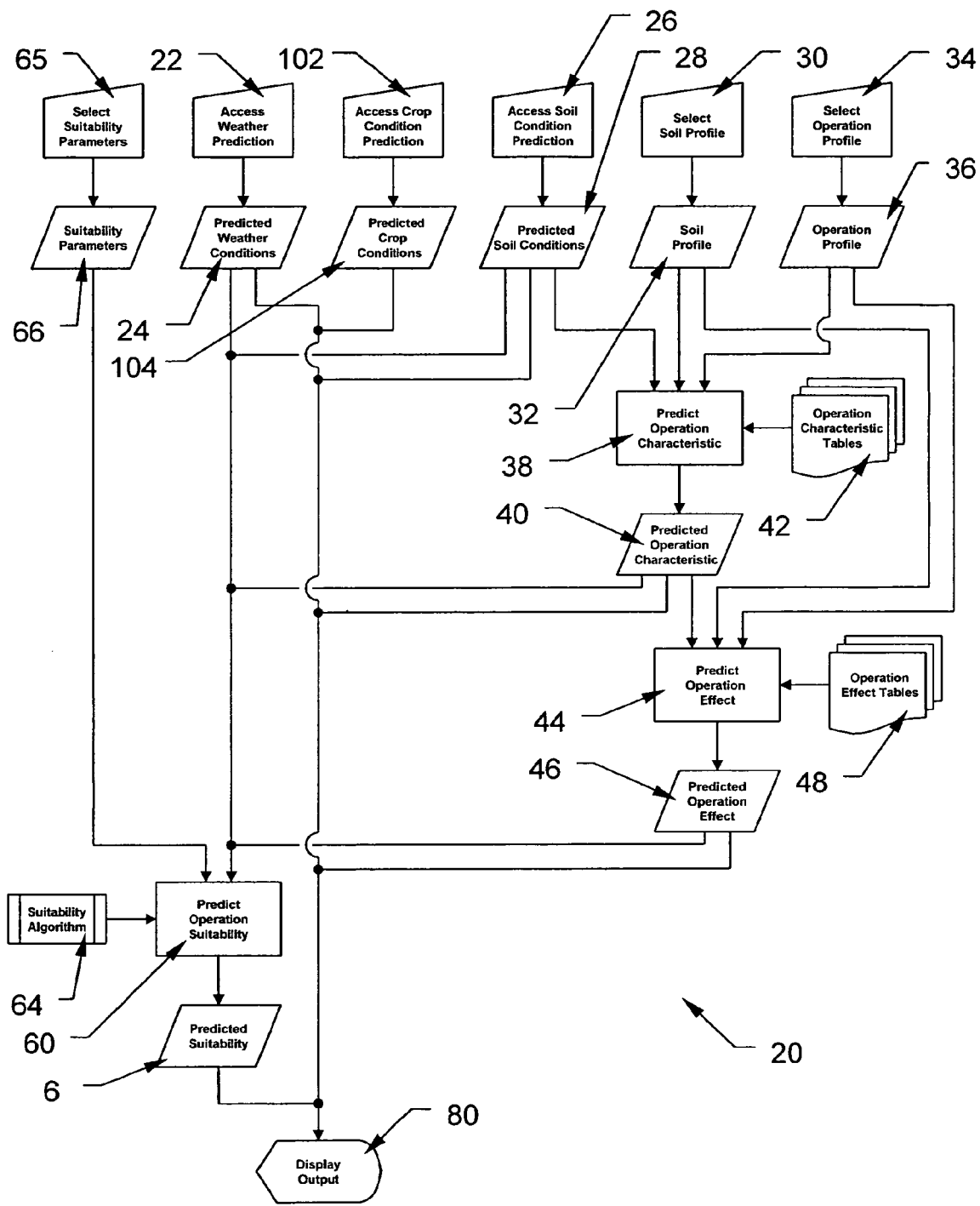
FIG. 2 illustrates a first embodiment for the present invention method.

FIG. 2 illustrates a first embodiment 20 of the present invention whereby the method predicts operation variables 8 indicative of operation performance suitability 6 at field node 12. The first step 22 in this embodiment 20 is to access values predicted for weather conditions 24 at the node 12. These predicted weather conditions 24 include values for, but are not limited to, temperature, relative humidity, wind speed, precipitation, and solar radiation. Values for these conditions 24 can be obtained from sources such as the National Weather Service website, operated by the National Oceanic and Atmospheric Administration.

The second step 102 in this embodiment 20 is to access values predicted for crop conditions 104 at the node 12 at different points in time. These crop conditions 104 include, but are not limited to, crop maturity level and crop moisture content. The third step 26 in this embodiment 20 is to access values predicted for soil conditions 28 at the node 12 at different points in time. These soil conditions 28 include, but are not limited to, soil moisture and soil temperature. To predict values for both crop conditions 104, and soil conditions 28, the method may use a dynamic soil model, such as the Precision Agricultural-Landscape Modeling System (PALMS) developed under NASA's Regional Earth Science Application Center (RESACA) program. This program predicts crop maturity and moisture, and soil moisture and temperature, as well as other variables, based on predicted weather conditions, measured soil conditions, and crop season parameters. This computer program is available under license for research or commercial use through the Wisconsin Alumni Research Foundation.

The fourth step 30 in this embodiment 20 is to select a soil profile 32 representative of the field node 12. A soil profile 32 describes a particular soil for which empirical tests have been conducted for this method 20. A soil profile 32 includes information such as soil type and composition, down to several feet. The fifth step 34 is to select an operation profile 36 representative of the crop harvesting operation to be performed. An operation profile 36 describes a particular operation for which empirical tests have been conducted for this method 20. Operation profiles 36 include parameters such as operation type, equipment size, machine configuration, and operation speed. The operation profile 36 might also include additional parameters such as crop species and fuel price.

The sixth step 38 in this embodiment 20 is to predict operation characteristics 40 that are resultant upon performance of the operation under the predicted soil conditions 28. Operation characteristics 40 are generally indicative of operation suitability 6, and include, but are not limited to, soil compaction impact ($\Delta$ compaction), soil particle size, tractive efficiency, and fuel consumption. In the illustrated embodiment 20, these operation characteristics 40 are determined by referring to empirical tables 42 giving values for known soil conditions 28, soil profile 32, and operation profile 36. For example, a table 42 giving values for $\Delta$ compaction may be developed by performing the crop harvesting operation under a number of soil moisture conditions on a test plot having a consistent soil composition. The parameters of the harvesting operation performed define the operation profile 36, and the composition of the test plot soil defines the soil profile 32.

The seventh step 44 in this embodiment 20 is to predict operation effects 46 that are resultant upon performance of the operation, given the predicted operation characteristics 40. Operation effects 46 are also indicative of operation suitability 6, and include, but are not limited to, crop yield impact and fuel cost. In the illustrated embodiment 20, these effects 46 are determined by referring to empirical tables 48 giving values for known operation characteristics 40, soil profile 32, and operation profile 36. For example, a table 48 giving values for crop yield impact may be developed by measuring crop yields under a number of soil compaction levels on a test plot having a consistent soil composition. Examples outlining the development of such tables 48 may be found in *Soybean Growth and Yield as Affected by Subsurface and Subsoil Compaction*, J. F. Johnson, et al., Agronomy Journal, Vol. 82, No. 5, September–October 1990.

Figure 3:
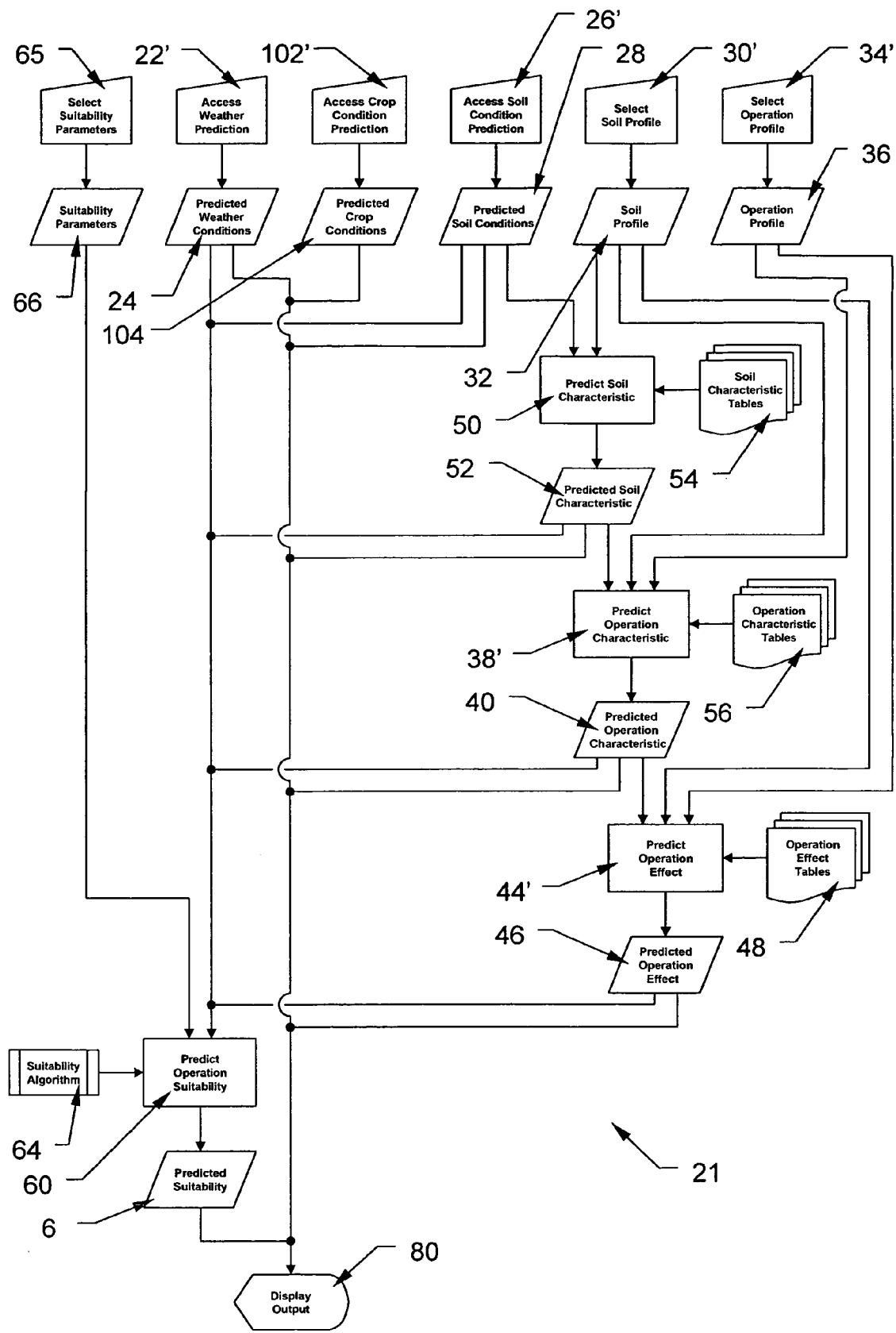
FIG. 3 illustrates a second embodiment for the present invention method.

FIG. 3 illustrates a second embodiment 21 of the present invention whereby the method predicts operation variables 8 indicative of operation performance suitability 6 at a node 12 within the field 10. The first step 22' in this embodiment 21 is to access values predicted for weather conditions 24 at the node 12, like the first embodiment 20. The second step 102' in this embodiment 21 is to access values predicted for crop conditions 104 at the node 12 at different points in time, as in the first embodiment 20. The third step 26' in second embodiment 21 is to access values predicted for soil conditions 28 at the node 12 at different points in time, like the first embodiment 20. The fourth step 30' in this embodiment 21 is to select a soil profile 32 representative of the field node 12, like the first embodiment 20.

The fifth step 50 in this embodiment 21 is to predict values for soil characteristics 52 for a soil under known soil conditions 28. The soil characteristic 52 of particular interest in this embodiment is Atterberg Limits. These soil characteristics 52 are determined in the illustrated embodiment 21 by referring to empirical tables 54 giving values for known soil conditions 28 and soil profile 32. These tables 54 may be generated by performing tests under a number of soil moisture conditions on specimens of soil profiles 32 according to *ASTM D 4318-00: Standard Test Method for Liquid Limit, Plastic Limit, and Plasticity index of Soils*.

The sixth step 34' in this embodiment 21 is to select an operation profile 36 representative of the crop harvesting operation. The seventh step 38' in this embodiment 21 is to predict operation characteristics 40 that are resultant upon performance of the operation, given the predicted soil characteristics 52. In the illustrated embodiment 21, these operation characteristics 40 are determined by referring to empirical tables 56 giving values for known soil characteristics 52, soil profile 32, and operation profile 36. For example, a table 56 giving tractive efficiency and fuel consumption may be developed empirically by performing the crop harvesting operation under a number of Atterberg Limit conditions.

The eighth step 44' in this embodiment 21 is to predict operation effects 46 that are resultant upon performance of the operation, given the predicted operation characteristics 40, in the same manner as the first embodiment 20. Alternatively, the method in this embodiment 21 may determine these operation effects 46 by calculating values based on predicted operation characteristics 40 and operation profile 36. For example, multiplying fuel consumption, an operation characteristic 40, by fuel price, an operation profile 36 parameter, predicts fuel cost for the operation.

The final step 60 of both the first embodiment 20 and second embodiment 21 is to predict operation suitability 6 at the node 12 for several points in time based on the predicted values for the operation variables 8. For clarity, the operation variables 8 include weather conditions 24, crop conditions 104, soil conditions 28, soil characteristics 52, operation characteristics 40, and operation effects 46. FIG. 4 illustrates a table 62 showing input and output for a harvest operation suitability algorithm 64. By selecting suitability parameters 65, the suitability algorithm 64 calculates suitability values for each operation variable 6 based on the corresponding suitability parameters 66. These parameters 66 define thresholds at which the operation variable is suitable 68 for the crop harvesting operation, and thresholds beyond which the variable is unsuitable 70.

For example, if a value for an operation variable 8 at a given point in time falls within the suitable value thresholds 68, then the suitability value 6' for that operation variable 8 is 100%. Conversely, if the value for the variable 8 falls outside of the unsuitable value thresholds 70, then the suitability value 6' for that operation variable 8 is 0%. Finally, if the value for the operation variable 8 falls within the transition range between suitable and unsuitable thresholds, then the suitability value 6' for that operation variable 8 is the fraction between the suitable threshold value 68 and unsuitable threshold value 70. FIG. 4 illustrates an example, with suitability parameters 66 for crop moisture having a suitable upper threshold value of 24%, and an unsuitable upper threshold value of 28%. Thus, for the predicted crop moisture I content of 26%, the suitability value 6' for crop moisture content calculates as $((26-24)/(28-14))\times 100 = 50\%$.

As illustrated, the suitability 66 parameters also include weightings 72 emphasizing relative importance of the operation variables 8 in assessing overall operation suitability 6 for the node 12. The suitability algorithm 64 calculates overall suitability 6 by multiplying each operation variable suitability value 6' by its corresponding weighting 72 for a weighted suitability value, then dividing the sum of the weighted suitability values by the sum of the weighting values 72. FIG. 4 illustrates an example of overall node suitability 6 for performance of a crop harvesting operation, based on predicted weather conditions 24, crop conditions 104, and operation characteristics 40.

Figure 5:
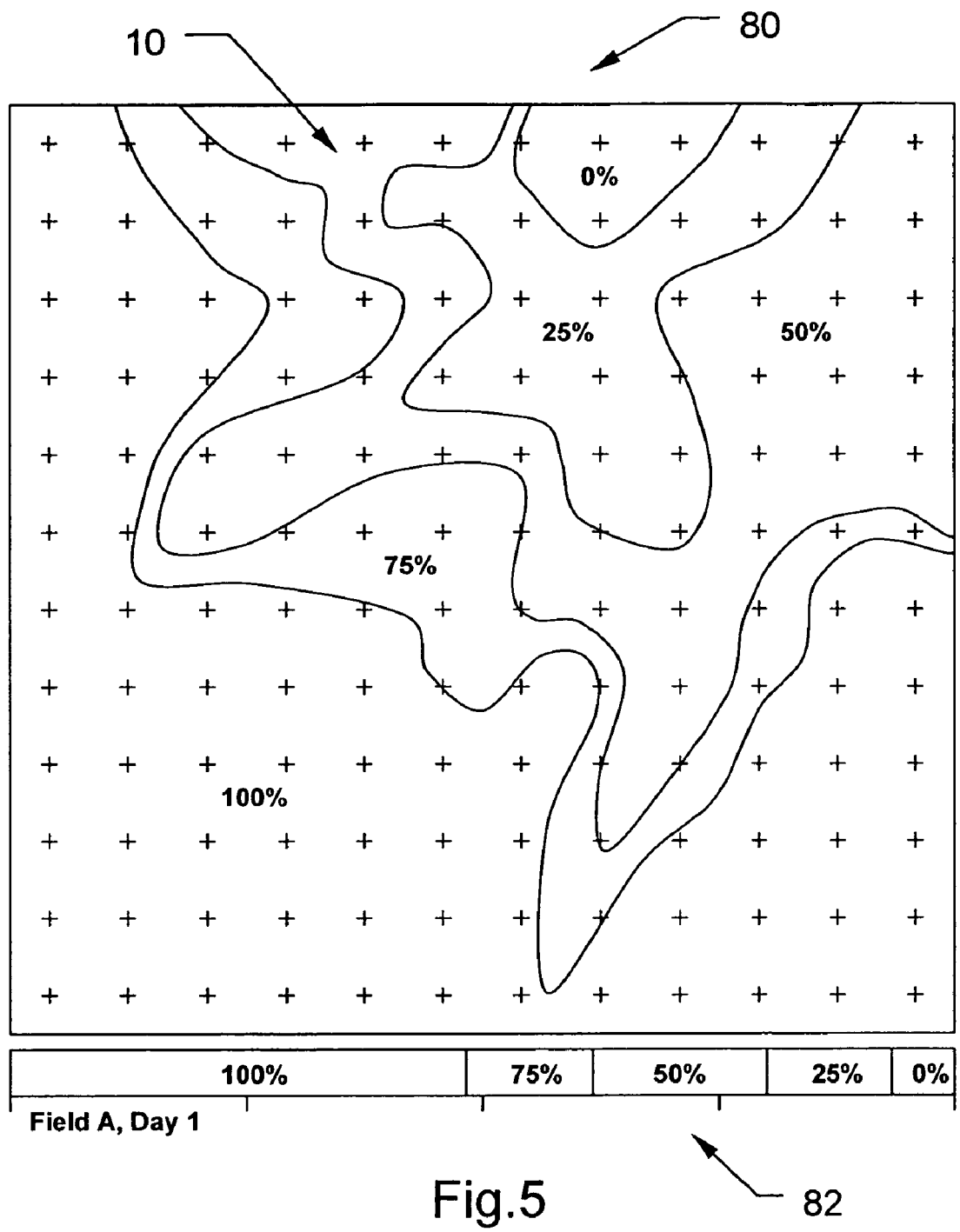
FIG. 5 illustrates a map displaying suitability values for performance of a crop harvesting operation over a single field on a single day.
Figure 6:
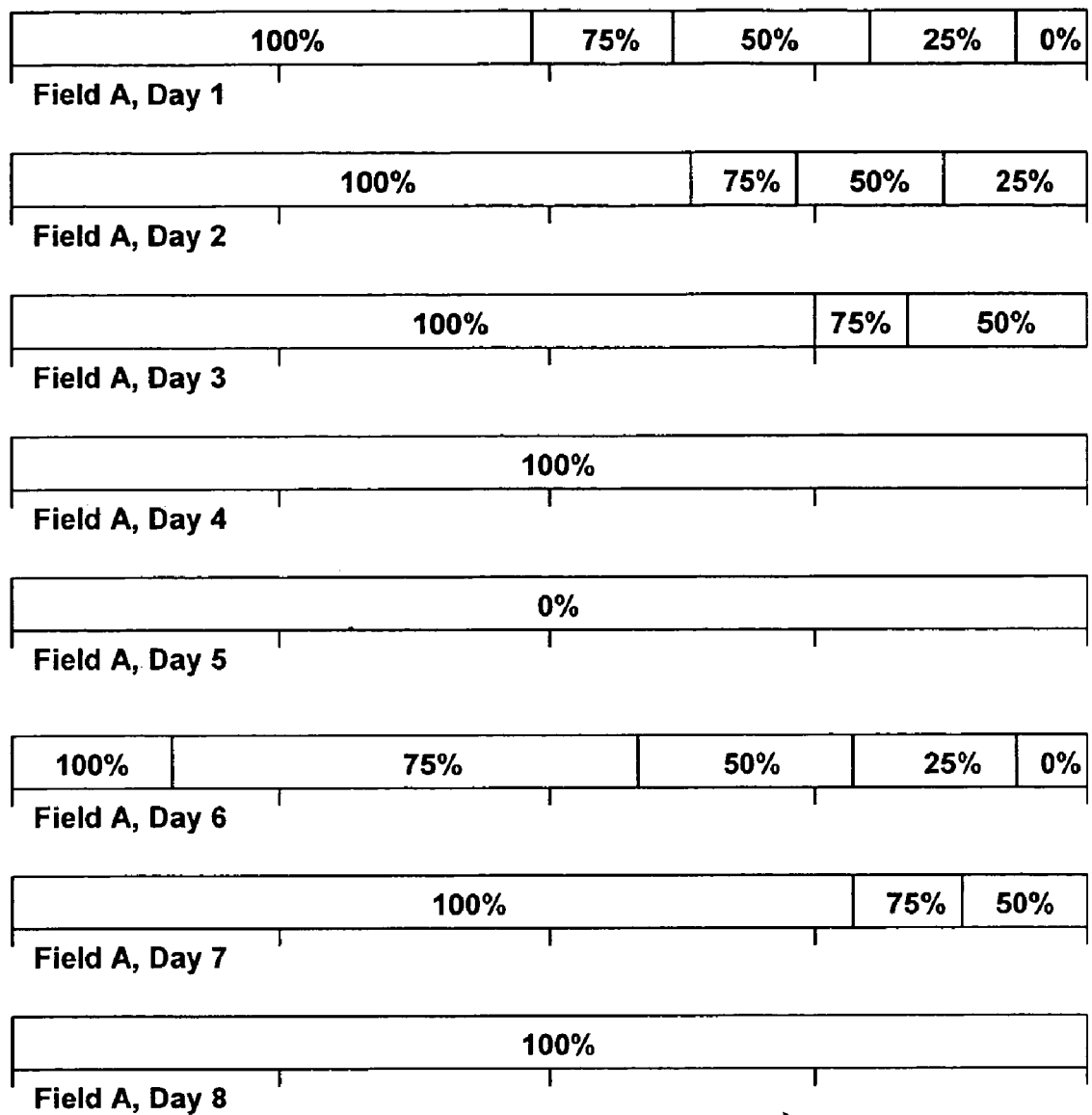
FIG. 6 illustrates a graphical displaying suitability values for performance of a crop harvesting operation over a single field for multiple days.
Figure 7:
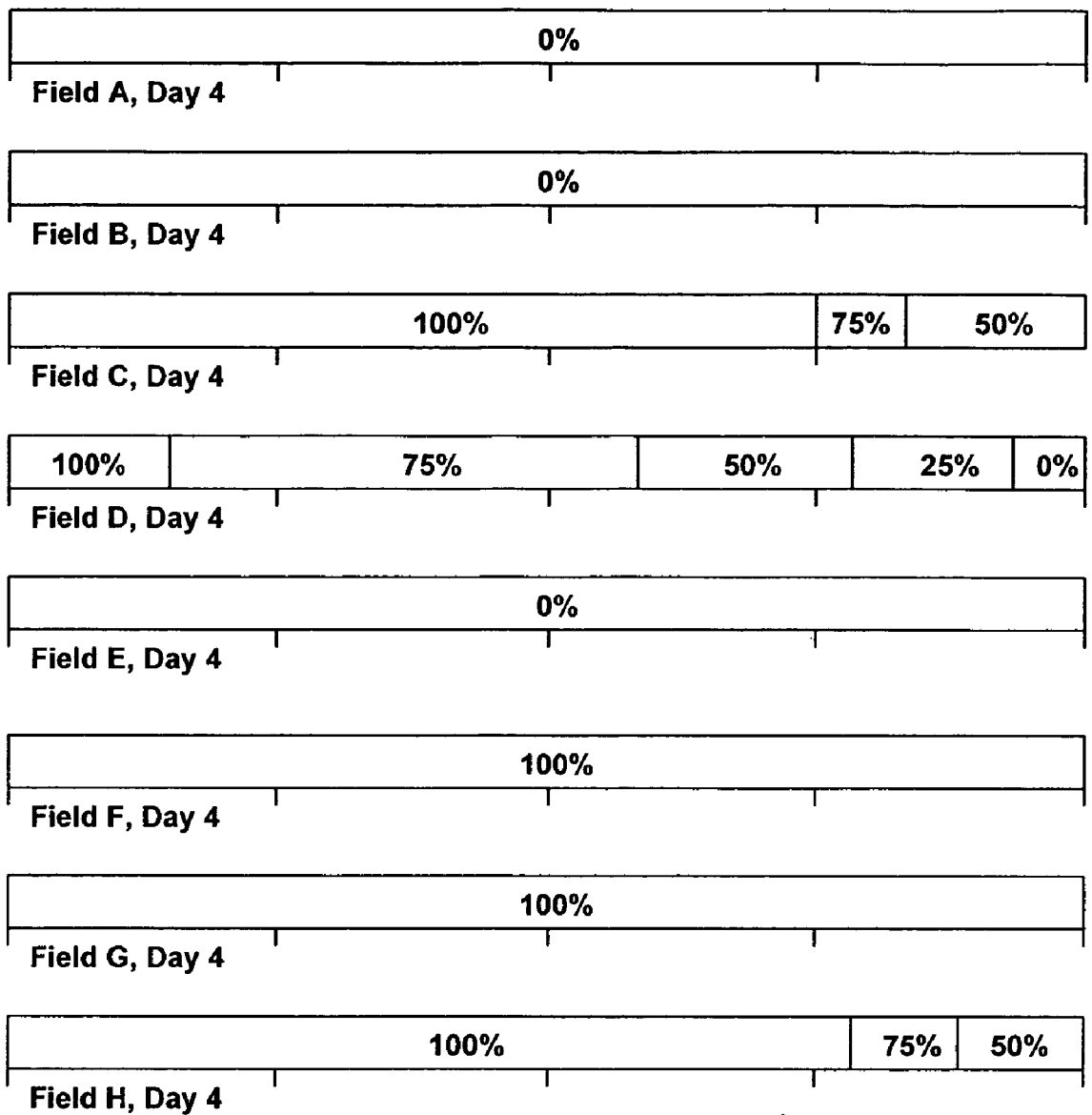
FIG. 7 illustrates a graphical displaying suitability values for performance of a crop harvesting operation over multiple fields on a single day.

Values for operation variables 8, operation variable suitability 6', and overall node suitability 6 generated from the foregoing method are available for display 80 in numerous forms. FIG. 5 shows an example of a map display 80 showing overall node suitability 6 for a crop harvesting operation over an entire farm field 10 on a single day. This figure also shows a summary of operation suitability 6 over the entire field 10 in a bar graph 82 at the bottom of the illustration. FIG. 6 shows a similar bar graph display 84 showing overall node suitability 6, but for multiple days in the farm field 10. This display 84 is especially useful when planning the best day for performance of a crop harvesting operation. Finally, FIG. 7 illustrates a bar graph display 86 showing overall node suitability 6 for multiple farm fields 10 on a single day. This display 86 is especially useful in selecting alternative fields 10 in which to perform the operation on a given day. It is of interest to note that a field 10 may never be suitable for performance of a particular type of soil engaging operation, given the predicted weather conditions 24, crop conditions 104, and soil conditions 28. Thus, this method becomes useful to assess economic impact of harvest operation timing, irrespective of suitability.

Having described the illustrated embodiments, it will become apparent that various modifications can be made without departing from the scope of the invention as defined in the accompanying claims.

The invention claimed is:

1. A method of predicting suitability for performance of a crop harvesting operation at a field node for different points in time, the method comprising steps of:

accessing predicted values for operation variables at the node for different points in time, wherein the operation variables include a value for at least one crop condition, and a value for at least one weather condition, soil condition, soil characteristic, operation characteristic, or operation effect;

selecting suitability parameters for each operation variable;

determining values for operation suitability at the node for different points in time using a suitability algorithm adapted to calculate values by comparing predicted operation variable values against the corresponding suitability parameters;

displaying values determined for harvest operation suitability at the node for different points in time.

2. The method described in claim 1, wherein the crop condition is crop maturity level or crop moisture content.

3. The method described in claim 1, wherein the harvest operation suitability value for one or more field nodes is displayed in a table, graph, or map.

4. The method described in claim 1, wherein one of the operation variable value for one or more field nodes is displayed in a table, graph, or map.

* * * * *